United States Patent
Narayanan et al.

(10) Patent No.: US 7,695,849 B2
(45) Date of Patent: Apr. 13, 2010

(54) LOW PT CONTENT DIRECT METHANOL FUEL CELL ANODE CATALYST: NANOPHASE PTRUNIZR

(75) Inventors: Sekharipuram R. Narayanan, Arcadia, CA (US); Jay F. Whitacre, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 1386 days.

(21) Appl. No.: 11/060,629

(22) Filed: Feb. 17, 2005

(65) Prior Publication Data

US 2010/0035123 A1    Feb. 11, 2010

Related U.S. Application Data

(60) Provisional application No. 60/545,633, filed on Feb. 17, 2004.

(51) Int. Cl.
*H01M 4/00* (2006.01)

(52) U.S. Cl. .................................................. 429/40

(58) Field of Classification Search ................. None
See application file for complete search history.

(56) References Cited

U.S. PATENT DOCUMENTS

| 4,814,002 A | * | 3/1989 | Grasselli et al. | ............. 148/551 |
| 4,868,073 A | * | 9/1989 | Hashimoto et al. | ............ 429/40 |
| 2009/0029219 A1 | * | 1/2009 | Fukazawa et al. | ............. 429/30 |

* cited by examiner

*Primary Examiner*—Robert Hodge
(74) *Attorney, Agent, or Firm*—Loeb & Loeb LLP (57) ABSTRACT

A method for the preparation of a metallic material having catalytic activity that includes synthesizing a material composition comprising a metal content with a lower Pt content than a binary alloy containing Pt but that displays at least a comparable catalytic activity on a per mole Pt basis as the binary alloy containing Pt; and evaluating a representative sample of the material composition to ensure that the material composition displays a property of at least a comparable catalytic activity on a per mole Pt basis as a representative binary alloy containing Pt. Furthermore, metallic compositions are disclosed that possess substantial resistance to corrosive acids.

7 Claims, 8 Drawing Sheets

LOW PT CONTENT DIRECT METHANOL FUEL CELL ANODE CATALYST: NANOPHASE PTRUNIZR

RELATED APPLICATIONS

This application claims benefit of priority from U.S. Provisional Application Ser. No. 60/545,633, filed Feb. 17, 2004, which is hereby incorporated by reference.

STATEMENT OF ACKNOWLEDGMENT OF GOVERNMENT SUPPORT

The invention described herein was made in the performance of work under a NASA contract, and is subject to the provisions of Public Law 96-517 (35 U.S.C. §202) in which the Contractor has elected to retain title.

BACKGROUND

Organic fuels can be used to generate electrical power by converting the energy released from the electrochemical reactions of the organic compounds into electrical current. Organic fuels like methanol are renewable and environmentally safe since the typical products from the electrochemical reactions are carbon dioxide and water. The use of fuel cells therefore avoids many of the environmentally detrimental consequences associated with burning fossil fuels, such as air pollution caused by exhaust from gasoline-powered internal combustion engines. The interest in organic fuel cells stems from the promise of organic fuels as an alternative, environmentally friendly energy source to non-renewable fossil fuels.

Direct liquid feed fuel cells use an aqueous solution of an organic fuel such as methanol in water or an acid-base system. The mixture is circulated past the anode of the cell wherein the organic fuel is oxidized, resulting in the production of electrons and the release of protons. The movement of electrons from the anode to the cathode occurs through the electrical load that generates electrical current. The protons generated at the anode traverse the membrane that separates the anode and cathode sections to permit electrochemical reduction of oxygen at the cathode. Electrical power is thereby generated by the simultaneous electrochemical reactions that occur at the anode and cathode of the fuel cell.

In the case of a direct methanol fuel cell (DMFC), methanol ($CH_3OH$) is used as the fuel, which undergoes oxidation to carbon dioxide ($CO_2$) at the anode according to the following electrochemical reaction:

$CH_3OH+H_2O \rightarrow CO_2+6H^++6e^-$.

Oxygen undergoes reduction to water at the cathode according to the following electrochemical reaction:

$O_2+4H^++4e^- \rightarrow 2H_2O$

The overall electrochemical reaction in the direct methanol fuel cell is:

$2CH_3OH+3O_2 \rightarrow 2CO_2+4H_2O+\text{Electrical Energy}$

Currently available DMFC systems are expensive and display low efficiency and low power density. A key contributor to the limited utility of DMFC systems is the limited performance exhibited by the state of the art electrocatalysts. Since methanol electrooxidation is a kinetically limited process, high catalyst loading levels are required. Typical catalyst materials are based upon noble metals like platinum (Pt) and ruthenium (Ru). To provide ample current levels from a DMFC system, approximately 2 to 10 milligrams (mg) of noble metal must be loaded onto each square centimeter of catalyst surface, which translates into a catalyst cost of up to approximately $3,000 per kilowatt of power generated from the DMFC system. The widespread commercial feasibility of DMFC systems requires the catalyst cost be approximately $100 per kilowatt, which means that catalyst loading must be reduced to 0.5 mg of noble metal per square centimeter of catalyst surface.

Furthermore, the fuel-to-electric efficiency of state of the art DMFC systems is about 22% and the power density of practical systems is about 15 W/kg. The feasibility of extending DMFC systems into portable applications requires smaller, more efficient systems, which means that the power density at the stack level should be doubled and that the overall efficiency should be increased to at least 35-40%. Notwithstanding the current challenges confronting DMFC system development, interest in DMFC systems is fueled by their potential to offer several times the energy storage capacity of advanced rechargeable lithium batteries. Thus, there is a significant need to develop electrocatalysts that display improved catalytic activities for this potential to become realized.

The prior art attempts to improve catalytic activities have focused on the development of the optimal surface area-to-volume ratio of the catalyst materials as a means for improving catalytic activity and for reducing the content of noble metal loading. Previous efforts devoted to improve anode catalysts have focused on using non-noble metal additives such as Nickel (Ni), Cobalt (Co), Vanadium (V), Iron (Fe), Copper (Cu), and Molybdenum (Mo) to enhance catalytic activity. The prior art compositions displayed lower electrode current densities than those found for commercial Platinum/Ruthenium (Pt/Ru) powders. These non-noble metal containing catalysts were not substantially resistant to the corrosive acidic environment in polymer electrolyte membrane fuel cells. Corrosion of cell components by the acid/alkali electrolyte imposes significant constraints on the materials that can be used for the cell. The metal compositions selected for the electrocatalyst must display robust resistance to the corrosive environments of the fuel cell environment.

The invention disclosed herein addresses the feasibility of improving the cost effectiveness of electrocatalysts by reducing Platinum (Pt) content of Pt/Ru catalytic powders through substitution of a portion of Pt with non-noble metals. The invention is directed to robust combinatorial fabrication methods for producing novel metallic material compositions with low Platinum (Pt) content that display substantial resistance to corrosive acids and at least the catalytic activity on a per mole Pt basis observed for prior art Pt/Ru binary alloys. As used herein, an alloy is composed of a mixture of two or more metals. The invention thereby provides a significant advance in the state of the art for material compositions that have applications in DMFC anode catalyst films and powders as well as in other applications where it is desirable to utilize metallic material compositions with reduced Pt content.

SUMMARY

In a first aspect, the present invention is a method for the preparation of a metallic material having catalytic activity that includes synthesizing a material composition comprising a metal content with a lower Pt content than a binary alloy containing Pt but that displays at least a comparable catalytic activity on a per mole Pt basis as the binary alloy containing Pt and evaluating a representative sample of the material composition to ensure that the material composition displays a property of at least a comparable catalytic activity on a per mole Pt basis as a representative binary alloy containing Pt.

A metallic composition comprising a metal content with a lower Pt content than a binary alloy containing Pt but that displays at least a comparable catalytic activity on a per mole Pt basis as the binary alloy containing Pt.

In a third aspect, the present invention is an anode for an electrochemical reaction, including a reactive surface comprising a metallic composition having a metal content with a lower Pt content than a binary alloy containing Pt but that displays at least a comparable catalytic activity on a per mole Pt basis as the binary alloy containing Pt.

In a fourth aspect, the present invention is a direct methanol fuel cell that includes an anode, including a reactive surface comprising a first metallic composition having a metal content with a lower Pt content than a binary alloy containing Pt but that displays at least a comparable catalytic activity on a per mole Pt basis as the binary alloy containing Pt and includes stack components.

DETAILED DESCRIPTION

The present invention makes use of the discovery of an efficient and robust fabrication method whereby controlled electrocatalyst surfaces can be rapidly created. The invention is drawn in part to the use of a thin-film multiple target co-sputtering deposition technique for metallic material composition fabrication that permits a few homogeneous monolayers of the material to be deposited onto an atomically smooth non-reactive current collector structure. Furthermore, the co-sputtering deposition technique can be configured as part of a high throughput method to enable the efficient identification of those compositions that display the desired physical properties from a combinatorial array of different compositions. A key aspect of the invention is the development of compositions wherein a portion of the Platinum (Pt) content of a Platinum/Ruthenium (Pt/Ru) binary composition is replaced by non-noble metals such as Nickel (Ni) and Zirconium (Zr). The resultant Ni/Zr/Pt/Ru quaternary compositions possess low Platinum (Pt) content relative to prior art electrocatalytic compositions. This collection of quaternary compositions display substantial resistance to corrosive acids found in DMFC systems. Importantly, this collection of quaternary compositions display at least a comparable catalytic activity on a per mole Platinum (Pt) basis as observed for commercial or other prior art Pt-based compositions having higher Pt content. The fabrication process for preparing these novel compositions and their application in DMFC systems and other areas is described below.

Fabrication of a Metallic Material Composition Using Co-Sputtering Deposition

Figure 1:
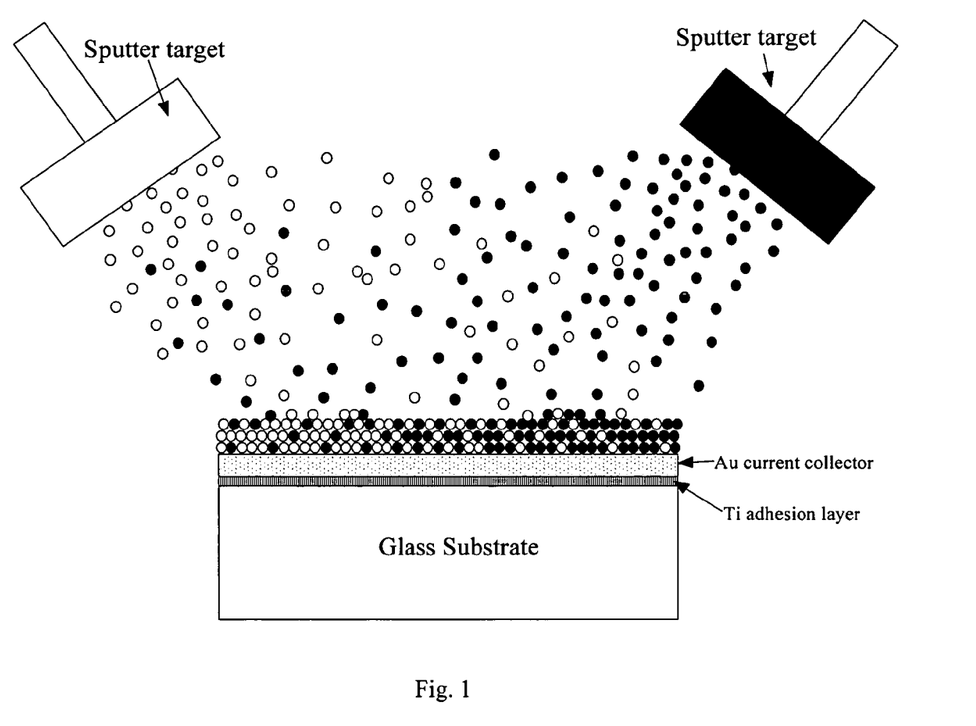
FIG. 1 depicts a schematic of a combinatorial co-sputtering process, wherein the atoms are simultaneously ejected from both the black and white sputter targets and subsequently condense upon a gold (Au) current collector substrate.

Preferably, room-temperature co-sputtering is used to deposit thin, smooth, compositionally-controlled catalyst films. FIG. 1 is a schematic of the representative deposition process. A plurality of magnetron sputter targets, each of which has a different chemical composition, is oriented towards a substrate surface, and separate sputter power sources are used simultaneously to generate adatom flux from all targets. The preferred power sources for the sputter targets include those with a radio frequency (RF) power supply or with a direct current (DC) power supply. The choice of power supply will depend upon a number of characteristics unique to the particular sputter target and the sputter emission. For example, a sputter target used with $Ni_{70}Zr_{30}$ was found to require a power source with an RF power supply rather than a DC power supply because only the RF power supply could satisfy the requirement for maintaining a strong glow discharge above the target, which was not feasible with the use of a DC power supply owing to the effect of Ni content on shape of magnetic flux lines created by the magnetron target holder.

The plurality of sputter targets comprise preferably at least two targets, more preferably 2-6 targets, and most preferably 2-3 targets. The plurality of sputter targets are oriented towards a substrate surface such that the sputter targets are positioned at substantially the same height and distance from the substrate surface. More preferably, the plurality of sputter targets are arranged in a regular geometry above the substrate surface. For example, the use of three sputter targets would have a geometrical arrangement of 120 degrees with respect to each other above the substrate, whereas the use of six sputter targets would have a geometrical arrangement of 60 degrees with respect to each other above the substrate. This ensures that the resultant film has a composition that varies laterally across the substrate, as indicated schematically in FIG. 1 wherein a film deposition containing black and white constituents are created on a substrate using two co-sputter targets.

The atomic composition emitted from each sputter target is either a monoatomic composition or a polyatomic mixture (a mixture of different atomic species). Though monoatomic compositions used in the co-sputtering technique are usually substantially free of contaminants, a sputter emission may include a small amount of contamination if the original monoatomic composition contains impurities. A polyatomic composition having a mixture of atomic elements $X_{35}$ and $Y_{65}$ reflects a composition mixture that contains 35 mole percent of element X and 65 mole percent of element Y. Though the sum of percent mole fractions for the atomic species present in a polyatomic composition is nominally 100 percent, the presence of impurities in the pure atomic element compositions of X and Y will reduce the relative percentage of these species in the sputter emission.

A sputter emission of a monoatomic or polyatomic compositions from a sputtering target may also contain contaminants if the sputtering target was not properly cleaned before use. It is preferable to flush loose contaminants from the sputtering target prior to forming a material deposition on a substrate by pre-sputtering the targets for a brief time (e.g., 5 minutes) in the absence of the substrate. The pre-sputtered targets are briefly powered off, typically 30 seconds or less, so that the substrate may be positioned for the deposition process. Pre-sputtered targets result in sputter emissions having uniform compositions during the co-sputtering deposition process.

Both pre-sputtering and co-sputtering deposition processes occur under a reduced atmospheric condition. The co-sputtering chamber is initially purged to a pressure of greater than 5×10−7 Torr before being back-filled with 30 mTorr of Argon (Ar) flowing at nominally 50 standard cubic centimeters per minute (sccm).

Co-sputtering depositions are initiated by simultaneously powering on all sputtering targets for a period of time sufficient for creating a film deposition on a substrate surface. The co-sputtering deposition process continues for a time sufficient to generate a composition film on the substrate surface and will depend upon the thickness of the composition film sought. Preferred co-sputtering deposition times range from about 60 seconds to about 120 seconds. Composition films having a thickness of 5 nm or less are preferred. Composition films having a thickness of 100 Angstroms or less are more preferred. Very little diffusion or segregation occurred within these films because the substrate was nominally at room temperature during the deposition. The resulting films have the same bulk and surface compositions at any specific area of the electrode.

As described further in the Examples, target compositions of the present invention comprise Platinum (Pt), Ruthenium (Ru), Zirconium (Zr), and Nickel (Ni) as examples of monoatomic compositions and $Ni_{70}Zr_{30}$ and $Pt_{60}Ru_{40}$ as examples of polyatomic compositions. Materials comprising quaternary compositions are specifically disclosed in the Examples; however, materials comprising compositions of any order greater than a binary composition fall within the spirit of the invention and include ternary, quaternary, quanternary, and higher order compositions.

Furthermore, other compositions beyond that disclosed herein fall within the scope of the invention. For example, while specific NiZrPtRu compositions are disclosed herein that are suitable for use in DMFC anode catalysts (see below), other atomic elements that share similar physical-chemical attributes may substitute for one or more of the elements of these particular compositions. Thus, Iron (Fe), Cobalt (Co), and Nickel (Ni) share similar electronic properties to suggest that Iron (Fe) or Cobalt (Co) may be substituted for Nickel (Ni). Likewise, Rhenium (Re), Chromium (Cr), Titanium (Ti), Hafnium (Hf) and Zirconium (Zr) share similar electronic properties to suggest that Rhenium (Re), Chromium (Cr), Titanium (Ti), or Hafnium (Hf) may be substituted for Zirconium (Zr). While Platinum (Pt) and Ruthenium (Ru) each displays unique exclusive properties as noble metals, the electronic similarities of Palladium (Pd) with Platinum (Pt) and of Iridium (Ir) and Osmium (Os) with Ru suggest suitable quaternary compositions are possible that contain Palladium (Pd) as a substitute for Platinum (Pt) or Iridium (Ir) and Osmium (Os) as a substitute for Ruthenium (Ru).

Figure 6:
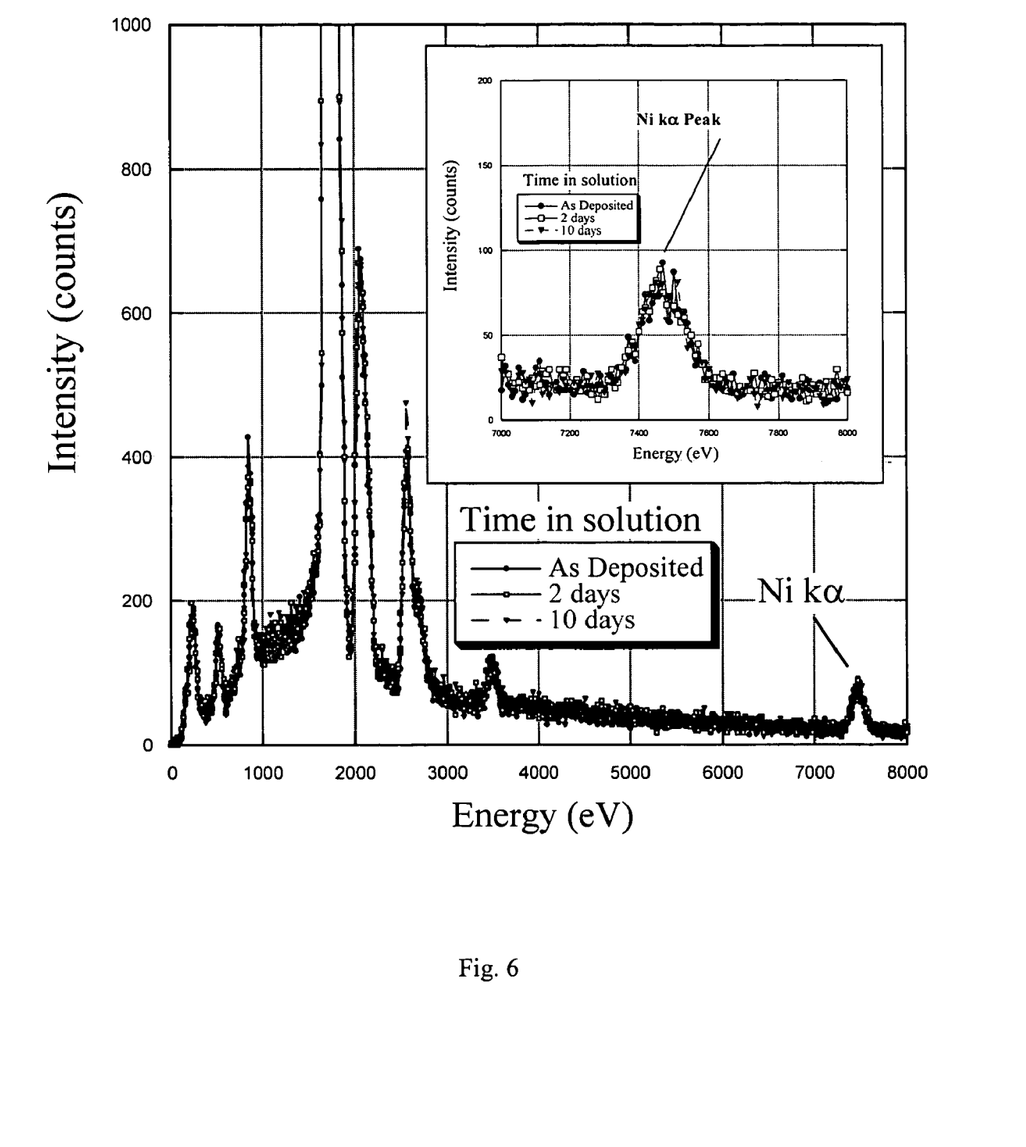
FIG. 6 depicts results of x-ray energy dispersive spectroscopic analysis of Ni content for a ~5 nm thick $Ni_{31}Zr_{13}Pt_{33}Ru_{23}$ film that had been exposed to a 1M $H_2SO_4$/1M $CH_3OH$ solution for a period of 0, 2, or 10 days.

Fabrication of a Quaternary Material Compositions with Low Pt Content Suitable for Use as a DMFC Anode Catalyst Preferred material compositions for DMFC anode catalysts of the present invention display substantial resistance to corrosive acids and have a catalytic activity at least comparable on a per mole Pt basis as observed for prior art PtRu binary compositions. Substantial resistance to corrosive acids is adjudged by the ability of the composition to withstand exposure in 1M sulfuric acid-methanol (1M $H_2SO_4$/1M $CH_3OH$) solutions for a period of 2 to 10 days without loss of compositional integrity. One test to ascertain the integrity of a composition ("compositional integrity") is to determine whether one or more atomic elements have leached from the composition. This determination can be performed using a number of techniques, such as x-ray energy dispersive spectroscopy or Rutherford backscattering spectroscopy. FIG. 6 illustrates an example of this technique, wherein the Nickel (Ni) content of films was monitored following exposure of the films to 1 M $H_2SO_4$/1 M $CH_3OH$ solutions for a period of 0, 2, and 10 days. As shown in FIG. 6, little, if any, diminution of Nickel (Ni) content occurred following exposure of the film to the acid environment.

Figure 3A:
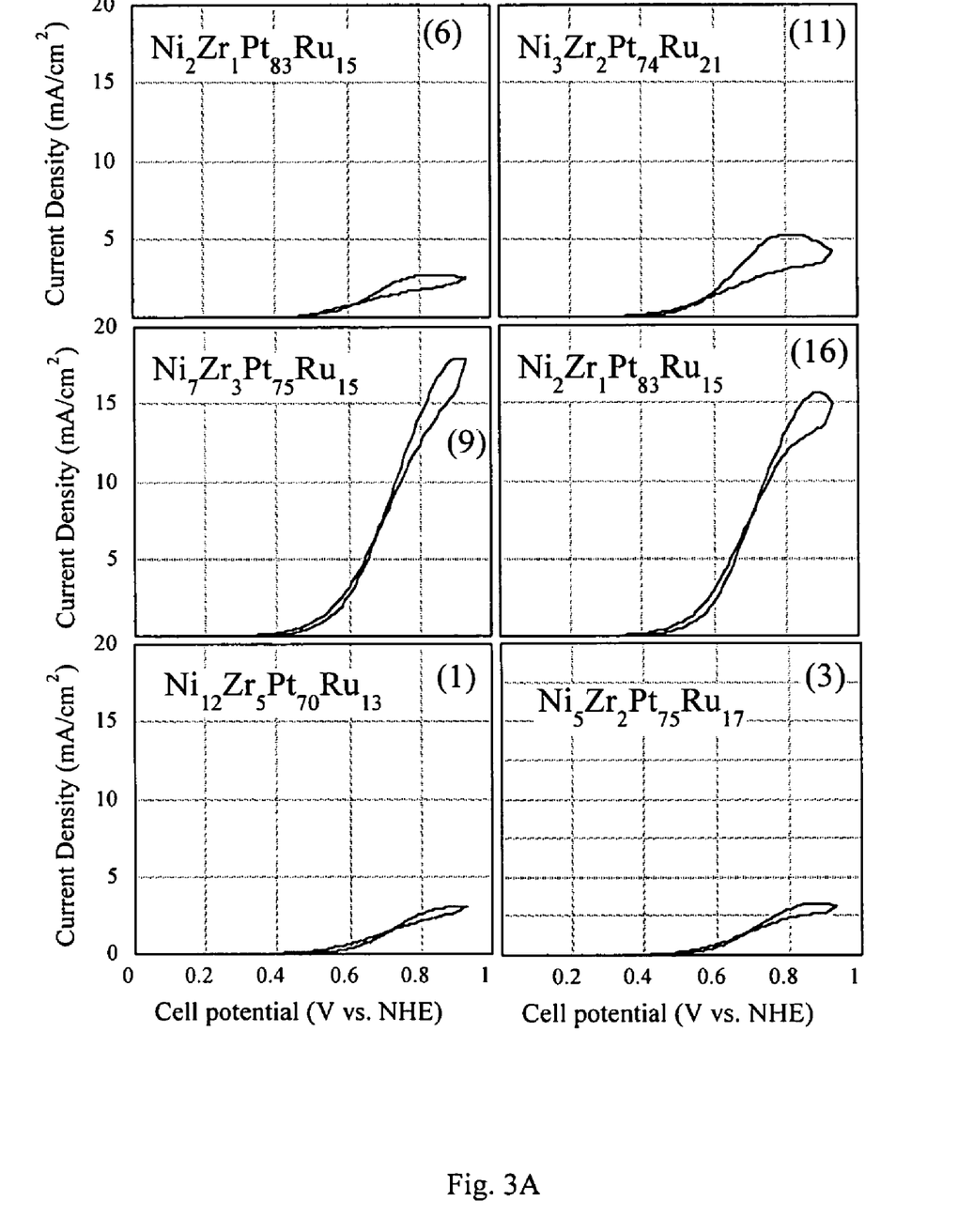
FIG. 3A depicts cyclic voltammetry results for a variety of Ni/Zr/Pt/Ru electrodes fabricated according to the invention.
Figure 3B:
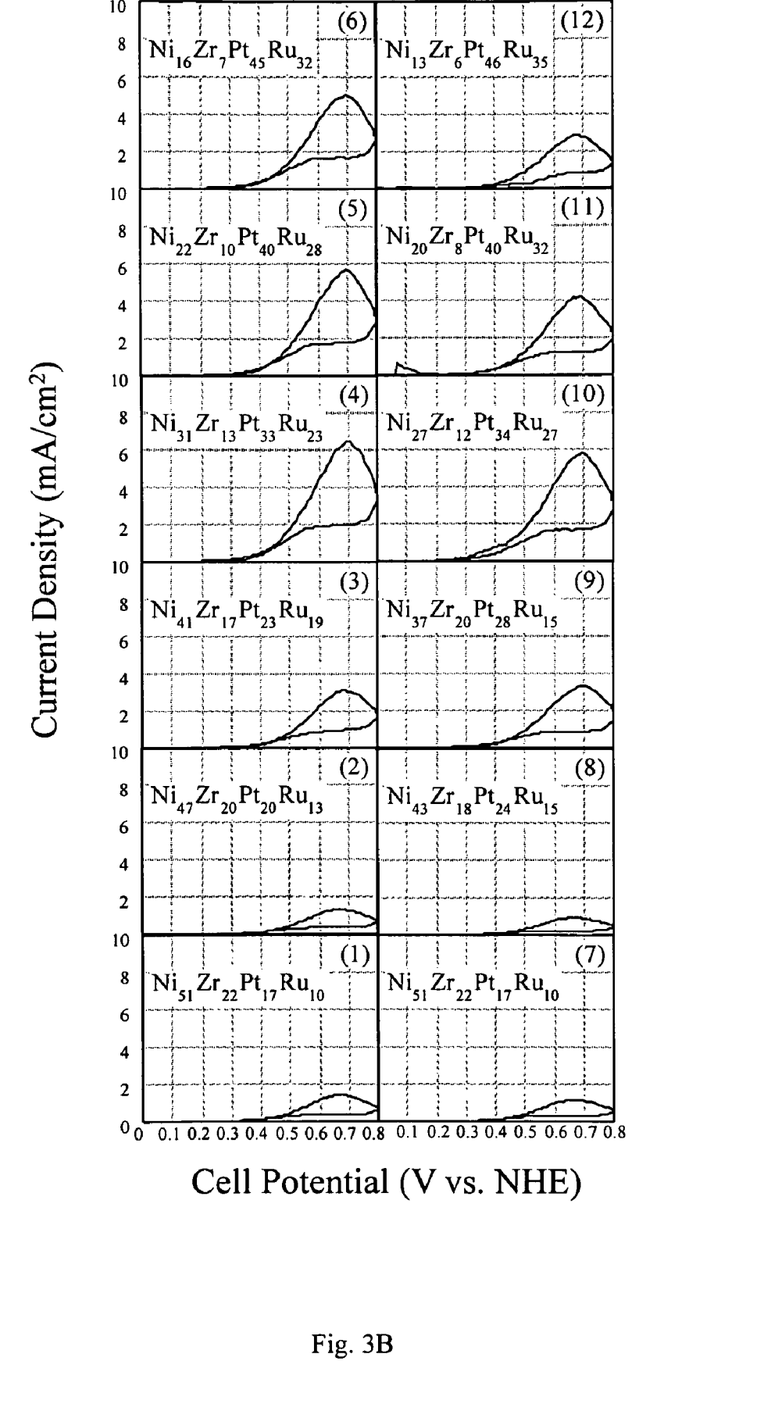
FIG. 3B depicts cyclic voltammetry results for a variety of Ni/Zr/Pt/Ru electrodes fabricated according to the invention.

The catalytic activity of the material composition may be ascertained by performing cyclic voltammetry and steady-state potentiostatic polarization measurements. The Examples provide illustrations of these measurements (see FIG. 3). Preferred compositions of the present invention have the following catalytic properties: low onset potentials, preferably in the range of about 0.25 V to about 0.32 V, maximum current potentials, preferably in the range from about 0.67 V to about 0.69 V, activation energies in the range of about 45 kJ/mol to about 75 kJ/mol, and a current density of at least 0.016 mA/cm$^2$ (electrode area) at room temperature (at 0.45 V vs. RHE in 1M $CH_3OH$ at room temperature after 300 seconds).

High Throughput Electrochemical Screening of a Combinatorial Library of Material Compositions Since the co-sputtering deposition technique produces a material composition that varies laterally across the substrate, the method lends itself to the production of a combinatorial library of material compositions whose electrochemical properties may be rapidly screened in a high throughput manner. A two-dimensional array of gold (Au) current collectors was created using photolithography/wet etching techniques. As described more thoroughly in the Examples, glass substrates were sputter coated initially with a thin Titanium (Ti) layer followed by a nominal Gold (Au) layer. The current collector pattern was defined using a positive photoresist and a custom-designed photomask. Once the Gold/Titanium (Au/Ti) layers were etched away, the photoresist was removed with acetone. An example of the two-dimensional array is illustrated in FIG. 2A.

A stainless steel physical mask was used to cover the current-collector array, the assembly was loaded into the sputter deposition chamber, and subjected to co-sputtering deposition (FIG. 2B). Following deposition, the individual Gold (Au) current collectors can be evaluated for their electrochemical properties using a pseudo-potentiostat. The material compositions of individual current collectors can be determined using x-ray energy dispersive spectroscopy. By correlating the electrochemical properties of the current collector with the material composition, one can rapidly identify the preferred material composition based upon the catalytic activity observed on a per mole Platinum (Pt) basis. Preferred material compositions have a per mole Platinum (Pt)-content of less than 80 percent (the mole fraction percent observed for commercial Platinum/Ruthenium (Pt/Ru) alloy compositions typically used in current DMFC anode catalysts).

Even more preferable material compositions of the present invention are those having a lower Pt content than a binary alloy containing Platinum (Pt) but that display at least a comparable catalytic activity on a per mole Platinum (Pt) basis as the binary alloy containing Platinum (Pt). In particular, the present invention is directed to materials of the general composition $Ni_mZr_nRu_oPt_p$, wherein m, n, o, and p represent the respective percent mole factions of Nickel (Ni), Zirconium (Zr), Ruthenium (Ru), and Platinum (Pt) in the composition, and wherein the composition possesses catalytic activity when used in a direct methanol fuel cell. Preferred materials of the present invention include compositions wherein Nickel (Ni) is present in a percent mole fraction in a range from about 20 to about 40, wherein Zirconium (Zr) is present in a percent mole fraction in a range from about 5 to about 20, wherein Ruthenium (Ru) is present in a percent mole fraction in a range from about 15 to about 30, and wherein Platinum (Pt) is present in a percent mole fraction in a range from about 20 to about 40. Specifically, material compositions of the present invention include: $Ni_7Zr_3Pt_{75}Ru_{15}$, $Ni_3Zr_2Pt_{74}Ru_{21}$, $Ni_{12}Zr_5Pt_{70}Ru_{13}$, $Ni_{13}Zr_6Pt_{46}Ru_{35}$, $Ni_{16}Zr_7Pt_{45}Ru_{32}$, $Ni_{22}Zr_{10}Pt_{40}Ru_{28}$, $Ni_{20}Zr_8Pt_{40}Ru_{32}$, $Ni_{27}Zr_{12}Pt_{34}Ru_{27}$, $Ni_{31}Zr_{13}Pt_{33}Ru_{23}$, $Ni_{43}Zr_{18}Pt_{24}Ru_{15}$, $Ni_{41}Zr_{17}Pt_{23}Ru_{19}$, $Ni_{47}Zr_{20}Pt_{20}Ru_{13}$, and $Ni_{51}Zr_{22}Pt_{17}Ru_{10}$. Most preferably, the present invention is drawn to the material comprising $Ni_{31}Zr_{13}Pt_{33}Ru_{23}$.

The $Ni_{31}Zr_{13}Pt_{33}Ru_{23}$ material displays superior catalytic activity on a per mole Platinum (Pt) basis better than even one of the best binary materials, $Pt_{84}Ru_{16}$ (see FIG. 4B), whose composition is similar to commercial Platinum/Ruthenium (PtRu) binary alloys currently used for DMFC anode catalysts. Analyses of this material showed that it was nanophase/amorphous in structure and possessed a very different electronic structure that the common FCC Pt-based alloys usually used for DMFC anode catalysis (see FIG. 5). These results support the conclusion that the catalytic process for the $Ni_{31}Zr_{13}Pt_{33}Ru_{23}$ material is inherently different than that found in the Pt/Ru binary compositions and somehow allow for a more efficient use of Pt surface sites than commonly reported.

Catalyst Compositions as Powders

The disclosed material fabrication procedures, particularly when combined with the high throughput screening methodology outlined above, result in the discovery of novel material formulations that possess important attributes that are amenable to a number of applications. These attributes include a substantial resistance to corrosive acids and superior catalytic activities for DMFC systems. Once the material composition of the preferred films has been determined, it is possible to produce the formulations as powders. Such powders can be readily assembled as a mixture of the individual elemental components. Powder formulations are amenable to applications that would not necessarily require the use of co-sputtering deposition. For example, a powder formulation of a particular NiZrPtRu composition may be applied to a particular surface using only one sputter target having that powder formulation.

Compositions Suitable for Other Components of DMFC Systems

Because the DMFC anode catalyst environment is inherently corrosive, it is desirable to have components besides the electrocatalyst elements protected from the corrosion. For example, a DMFC system will typically include stack components (e.g., a tie-rod, an end plate, a bipolar plate) that would also be exposed to the acidic environment (see FIGS. 7A and 7B). A material composition having substantial resistance to corrosive acids can be used as a film coating on these additional components to provide corrosion protection. Substantial resistance to corrosive acids is ascertained using methods described previously in this disclosure. Preferably, such protective film coatings will have a thickness of about 5 nm or less.

It will be recognized that compositions providing substantial resistance to corrosive acids need not also possess catalytic activity. Thus, compositions affording only substantial resistance to corrosive acids will undoubtedly represent a greater subset of compositions than those that afford both substantial resistance to corrosive acids and catalytic activity. For example, compositions that afford only substantial resistance to corrosive acids need not necessarily contain Platinum (Pt). Thus, compositions that impart only a substantial resistance to corrosive acids are economically preferred for use as protective coating films for the non-catalytic components of DMFC systems as well as for other applications where substantial resistance to corrosive acids is desired.

EXAMPLES

Example 1

Current Collector/Substrate Preparation

Figure 2:
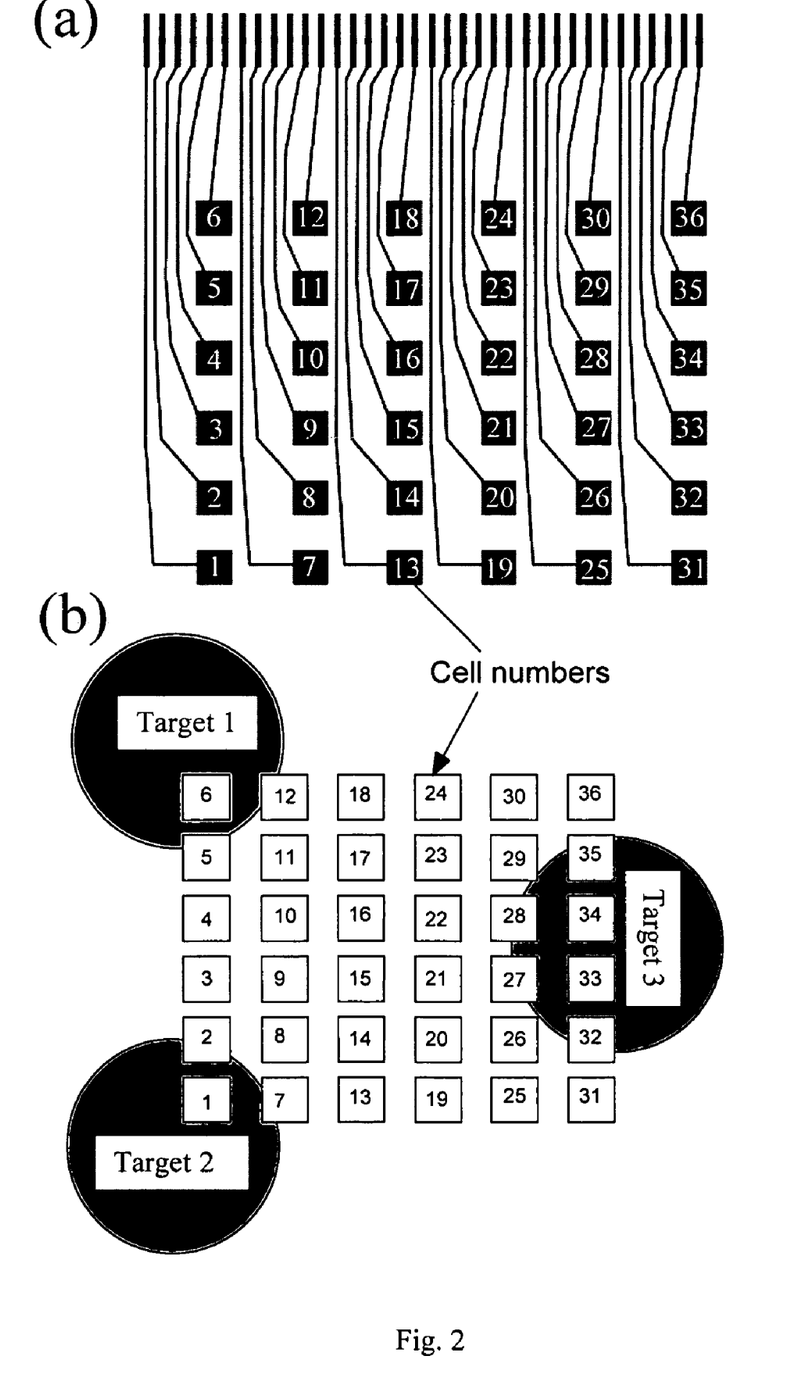
FIG. 2a depicts a positive photomask used to define a Titanium/Gold (Ti/Au) current collector array on a 1/16" glass substrate having 36 individual cells.
FIG. 2b depicts the relationship of each individual cell with respect to the three sputter targets used during an example co-sputtering deposition process.

A two-dimensional array of 36 0.5 cm² Gold (Au) current collectors was created using photolithography/wet etching techniques. 5"×5"×1/16" square polished glass substrates were sputter-coated with a thin (~400 Å) Titanium (Ti) adhesion layer followed by a 0.5 to 2 μm layer of Au. The current collector pattern was then defined on the substrate using AZ-1518 positive photoresist, a UV source, and a custom-designed photomask. The Gold (Au) and Titanium (Ti) layers were etched away using potassium-iodine and a diluted solution of hydrogen fluoride (HF), respectively. The pattern was subsequently removed in acetone, leaving only the electrode array on glass. FIG. 2 is an image of the photomask, with the number indicated for each of the thirty-six test electrodes. The Gold (Au) interconnect lines had total resistance values of approximately 5 ohms+/−20%, which were measured and used in calculating the actual electrode currents created during electrochemical testing.

Example 2

Catalyst Deposition using Combinatorial Co-Sputtering

The current-collector array of Example 1 was covered with a 1/64" thick stainless steel physical mask that exposed only the active electrode areas and was loaded into the sputter deposition chamber. Three independently powered 2" magnetron sputter targets were oriented towards the masked current collector assembly such that the spacing between the targets (nominally 8 cm) was similar to the average target-to-substrate distance. The substrate was mounted onto a sliding armature that was used to position the substrate above a protective shutter during pre-sputtering. The chamber was turbo-pumped to a base pressure better than $5\times10^{-7}$ Torr before being back-filled with 30 mTorr of Argon (Ar) flowing at nominally 50 sccm. The targets were pre-sputtered for at least 5 minutes before being briefly (less than 30 seconds) turned off to allow for the substrate to be moved into position. The targets were then simultaneously powered back on for the indicated deposition time (less than 2 minutes in all cases). Two or three target were used during any particular deposition, and target compositions were Pt, Ru, Zr, Ni/Zr (70/30), or Pt/Ru (60/40). Though many depositions were conducted, data presented here is from three representative runs. The conditions used for these three runs are shown in Table 1. The power source for target #1 was of the RF variety.

TABLE 1

Target composition and powers used during three different depositions.[1]

| Deposition | Target 1 Comp. | Target 1 RF Power | Target 2 Comp. | Target 2 DC Power | Target 3 Comp. | Target 3 DC Power | Time |
|---|---|---|---|---|---|---|---|
| 1 | Ru | 31 | $Pt_{60}Ru_{40}$ | 6 | Pt | 22 | 80 Sec |
| 2 | $Ni_{70}Zr_{30}$ | 32 | $Pt_{60}Ru_{40}$ | 8.4 | Pt | 12.7 | 80 Sec |
| 3 | $Ni_{70}Zr_{30}$ | 100 | $Pt_{60}Ru_{40}$ | 8.5 | None | 0 | 80 Sec |

[1] The overall catalyst film thickness was less than 100 Å at all points.

Deposition #1 was used to study the Pt/Ru system, while depositions 2 and 3 focused on the Ni/Zr/Pt/Ru quaternary system, where run #2 had a relatively high Pt content and run #3 had much less Pt. The sputter target powers were selected based on preliminary results that indicated the approximate catalyst compositional ranges that yielded highly catalytic material compositions. It was found that, for a binary system such as that used in Deposition #1, a three-target approach where 1 of the targets contained a mix of the two constituents allowed for the creation of a two-dimensional array of incrementally variable electrodes. If this were to be performed using only 2 sputter targets, much smaller test electrodes in a linear alignment would be necessary to attain compositional variety.

To allow for secondary materials characterization, identical depositions were performed on bare test-grade 6" Si wafers (with amorphous 5 nm oxide layer intact) as masked by the same electrode-defining stainless steel physical mask. Care was taken to insure that the substrate was in the same location (+/−1 mm) for all depositions.

Example 3

Rapid Parallel Electrochemical Screening

After deposition onto the masked current collector array of Example 2, the combinatorial test structure was analyzed using a 36-channel pseudo-potentiostat, which had a design fundamentally identical to that first described by the Dahn research group in 2003. In the present study, an Agilent 34970A data acquisition/switch unit with a 40-channel (vs. reference) input was used. The Agilent "Benchlink" software package was used to monitor the potential drop across a precision (+/−0.05%) 1-ohm resistor connected in series with each electrode at a frequency of 0.5 Hz. All 36 electrodes were driven in parallel using a PAR 273A potentiostat under the control of the Corrware™ electrochemical analysis software package. The test structure was immersed in a stirred liquid solution, and a mercury/mercury sulfate (SME) reference electrode was used along with a Pt counter electrode. Both the reference and the counter electrode were positioned approximately 10 cm from the plane of the sample electrodes to minimize the differential potential loss between the different electrodes resulting from variable electrode-to-reference distance. To further enhance purity, UHP Argon was bubbled through the solution throughout testing. Qualification testing indicated that the pseudo-potentiostat was able to collect data virtually identical to that collected using the single-channel 273A.

Multiple samples were studied to verify that sample currents were low enough such that the large distance between the reference and the active electrodes was not a significant source of experimental error.

Cyclic voltammetry (CV) and steady-state potentiostatic polarization (PS) experiments were conducted at temperatures ranging from 15 to 60° C. in a 1 M $H_2SO_4$/1M $CH_3OH$ solution. In the cyclic voltammetry experiments, 3 to 5 scans between 0.05 and 0.85 V vs. RHE at a rate of 5 mV/second were conducted, and the final equilibrated scan was designated as the representative data. In the steady-state experiments, current values were collected for 5 minutes at 0.45V and 0.75V vs. NHE. The 0.45 V bias was selected since it is similar to results commonly found in the literature. The actual electrode potentials were calculated after data acquisition by accounting for the potential drop across the 1 ohm precision resistor and the IR loss in the Au interconnect lines.

All current density values reported are normalized to the geometric electrode area, not an experimentally determined electrochemical surface area. Because the films were so thin and were deposited on smooth Au current collectors (as determined using plan view and cross-section SEM), it was assumed that all electrodes were similar in physical area and roughness, and could therefore be directly compared to each other. Furthermore, the electrochemical surface area is known to be difficult to determine for Pt/Ru-containing materials due to Ru-associated activity within the necessary voltage range.

Figure 4:
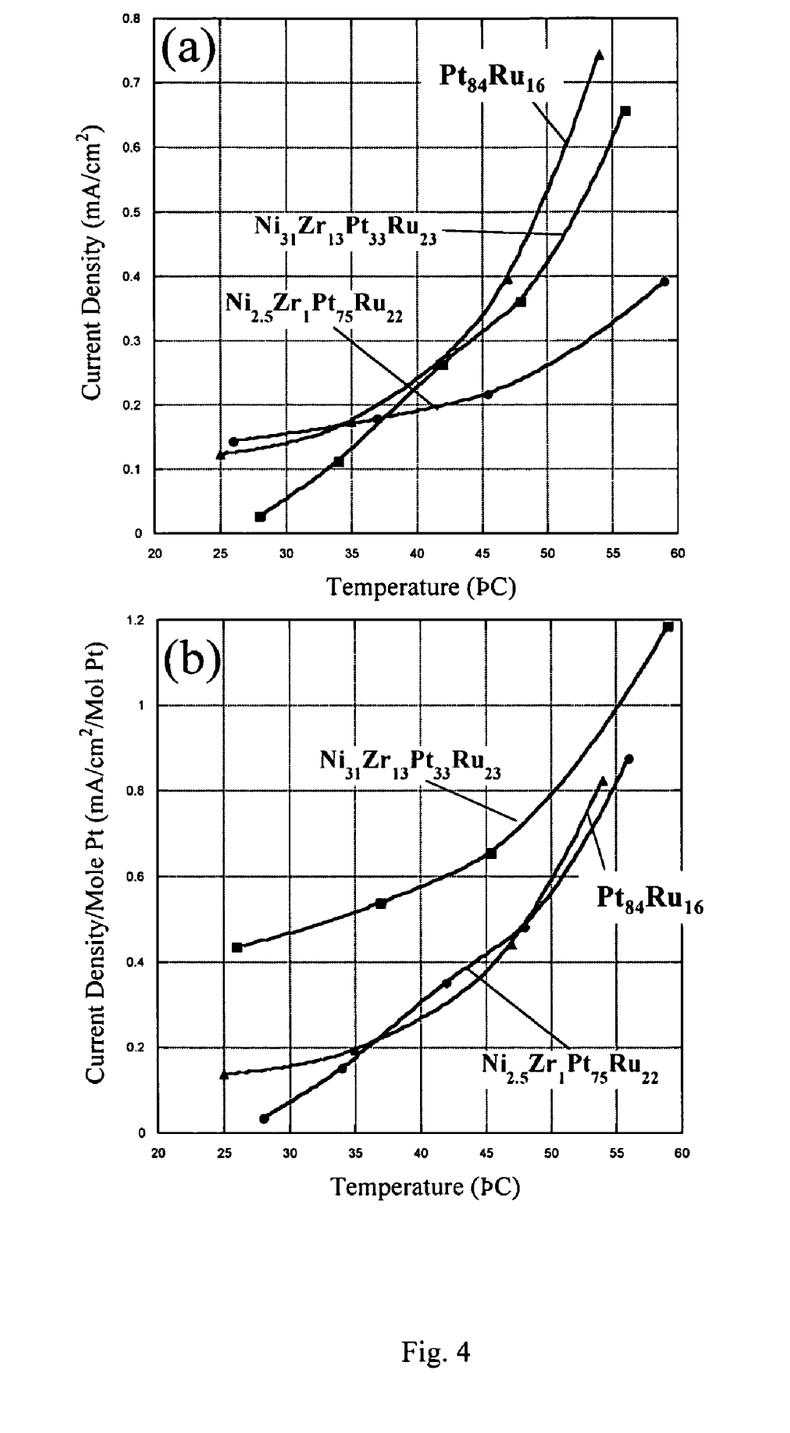
FIG. 4A depicts current density as a function of temperature for $Ni_{31}Zr_{13}Pt_{33}Ru_{23}$ material compositions in comparison to an optimized PtRu binary composition, $Pt_{84}Ru_{16}$.
FIG. 4B depicts the current density data of FIG. 4A normalized on a per mole Pt basis.
Figure 5:
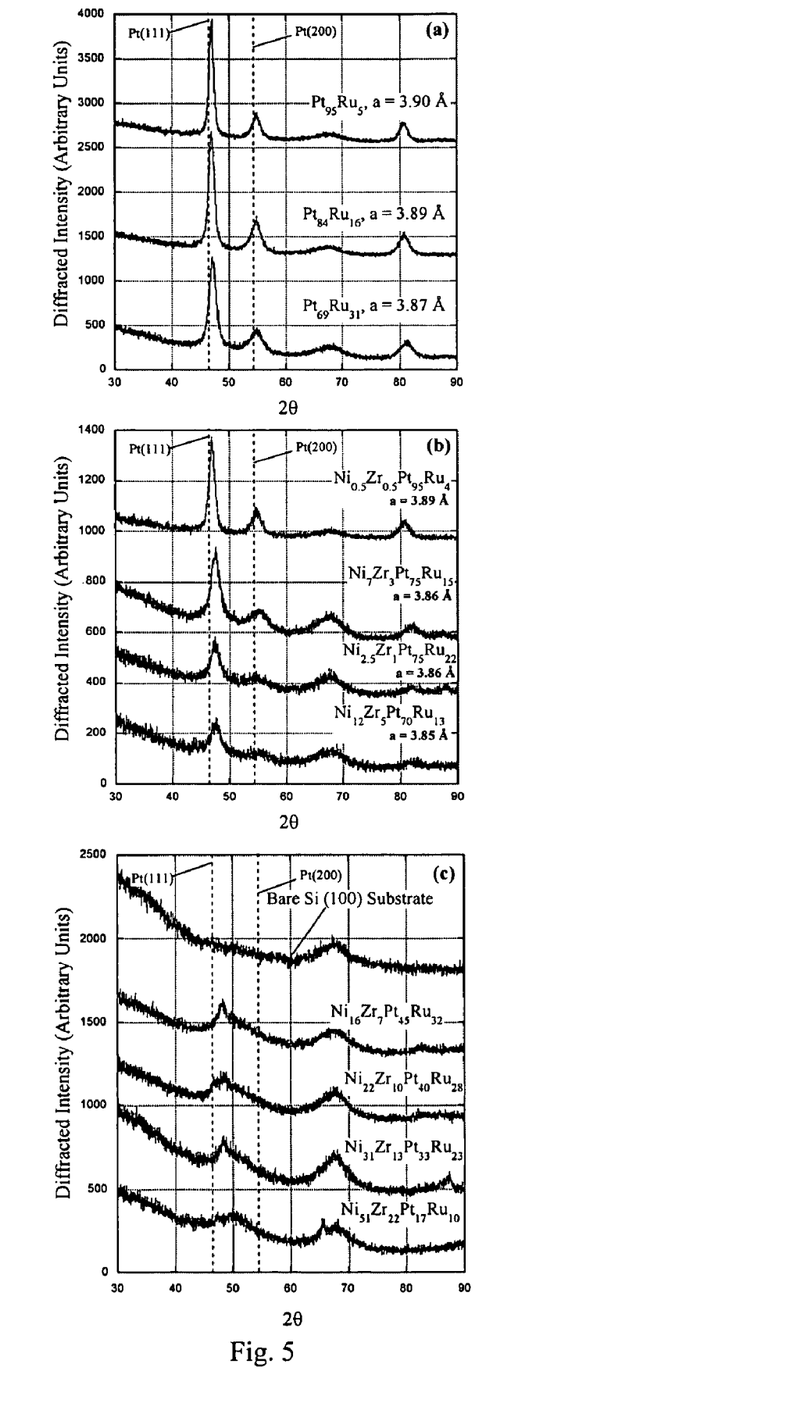
FIGS. 5A, 5B, and 5C illustrate x-ray diffraction data collected for NiZrPtRu material compositions in comparison with PtRu binary compositions, which illustrates that the binary compositions having high Pt content display an FCC nanocrystalline structure while the quaternary compositions having lower Pt content (13-70 percent mole fraction) display an amorphous/mixed nanophase structure (FIGS. 5B and 5C)

Typical results of these analyses are shown in FIGS. 3 and 4.

Example 4

Materials Analyses

Compositional Determination

After electrochemical screening, the composition of some of the films was examined using x-ray energy dispersive spectroscopy (XEDS). Data was collected on a Cambridge Stereoscan ($LaB_6$ filament) scanning electron microscope using an IXRF model 500 energy dispersive detector. The probe was calibrated using NIST standard alloy with known quantities of various atomic weight constituents. Measurement uncertainty was determined to be nominally +/−2%. An electron beam energy of 15 to 20 keV was used along with a 10 mm working distance, 30° angle of incidence, and a magnification of 3000×. To verify these results, several films were also examined using Rutherford backscattering spectroscopy (RBS).

Structure

X-ray diffraction data were collected from representative samples using an Inel curvilinear position sensitive detector (CPS 120) in conjunction with a Co sealed tube x-ray source (kαλ=1.79 Å). At the start and finish of each data session, a diffraction pattern from NIST $LaB_6$ standard was collected and used to verify/calibrate the instrument. To maximize the sampling volume in the thin film samples, grazing incidence geometry was used where the x-ray beam was incident upon the sample at an angle of less than 2 degrees.

Surface Chemistry

X-Ray photoelectron spectroscopy (XPS) spectra were collected from samples using a Perkin-Elmer PHI 5300 ESCA system. An aluminum x-ray source was used, and was powered at 300W, 15 kV. The chamber base-pressure before analysis was in the range of $8.5 \times 10^{-8}$ to $9.2 \times 10^{-9}$ Torr. A general survey for each sample was taken after sample introduction after which each sample was aligned for maximum count rate using the platinum 4f core doublet peaks. A piece of Alfa-Aesar Pt foil was used as a standard, and peaks from the (identical) sample collectors were evident for each sample and were used to verify as a secondary calibration indicator.

Fuel Cell Description

Figure 7:
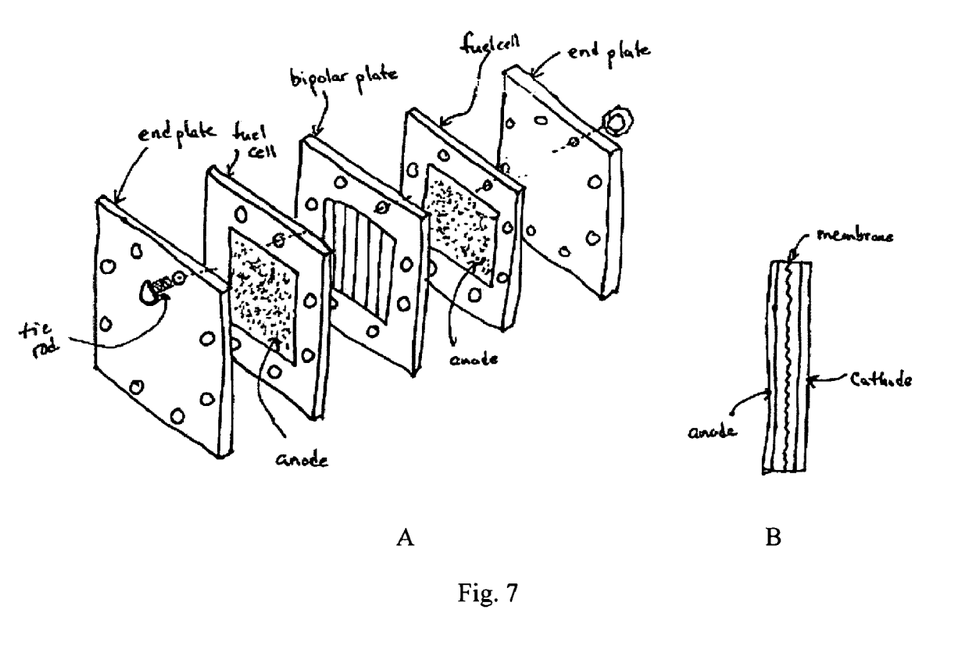
FIG. 7A depicts a schematic of a DMFC system that contains two end plates, two direct methanol fuel cells, a bipolar plate, and tie-rods of the present invention, wherein the speckled area represents the location of the anode catalyst having a NiZrPtRu film of the present invention.
FIG. 7B depicts a schematic of a direct methanol fuel cell of the present invention that contains an anode having a NiZrPtRu film, a membrane, and a cathode, wherein the a NiZrPtRu film is deposed on the anode surface facing the membrane.

The anode catalyst materials described herein are suited for use in direct methanol fuel cells and direct methanol fuel cell systems as such are commonly understood in the art. FIG. 7A illustrates a typical arrangement of a fuel cell system that comprises usually more than one fuel cell in association with stack components (e.g., end plates, bipolar plates, and tie-rods). FIG. 7B illustrates the typical arrangement of the fuel cell that contains an anode, a cathode, and an intervening membrane. The NiZrPtRu compositions of the present invention are deposed as a film on the reactive surface of the anode that faces the membrane. The membrane of the fuel cell is a proton exchange membrane that uses a proton-conducting polymer separator structure (typically Nafion). This material is acidic when used in a fuel cell environment.

The foregoing description and drawings merely explain and illustrate the invention and the invention is not limited thereto. Those of the skill in the art who have the disclosure before them will be able to make modifications and variations therein without departing from the scope of the present invention.

The invention claimed is:

1. A metallic composition having an activity as an anode catalyst in a direct methanol fuel cell, wherein the metallic composition comprises $Ni_{31}Zr_{13}Pt_{33}Ru_{23}$ and wherein the activity of the metallic composition is at least a comparable activity on a per mole Pt basis as a metallic composition comprising $Pt_{84}Ru_{16}$.

2. The metallic composition of claim 1, wherein the metallic composition comprises a powder or a film deposition.

3. The metallic composition of claim 1, wherein the metallic composition comprises a film deposition.

4. An anode for a direct methanol fuel cell, including a reactive surface comprising a first metallic composition comprising $Ni_{31}Zr_{13}Pt_{33}Ru_{23}$, wherein said first metallic composition displays at least a comparable catalytic activity on a per mole Pt basis as a second metallic composition comprising $Pt_{84}Ru_{16}$ when said metallic compositions are employed as anode catalysts in direct methanol fuel cells.

5. The anode of claim 4, wherein the first metallic composition comprises a film deposition.

6. A direct methanol fuel cell, comprising:
an anode, including a reactive surface comprising a first metallic composition comprising $Ni_{31}Zr_{13}Pt_{33}Ru_{23}$; and
stack components.

7. The direct methanol fuel cell of claim 6, wherein the first metallic composition comprises a film deposition.

* * * * *